(12) United States Patent
Reavell

(10) Patent No.: US 8,912,921 B2
(45) Date of Patent: Dec. 16, 2014

(54) OFF-ROAD MOTOR VEHICLE WARNING SYSTEM

(76) Inventor: James A. Reavell, Campbellford (CA)

( * ) Notice: Subject to any disclaimer, the term of this patent is extended or adjusted under 35 U.S.C. 154(b) by 234 days.

(21) Appl. No.: 13/171,154

(22) Filed: Jun. 28, 2011

(65) Prior Publication Data

US 2011/0316718 A1  Dec. 29, 2011

(51) Int. Cl.
*G08G 1/00* (2006.01)
*G08G 1/16* (2006.01)
*B60Q 1/26* (2006.01)
*B60Q 1/50* (2006.01)

(52) U.S. Cl.
CPC .............. *G08G 1/163* (2013.01); *B60Q 1/2696* (2013.01); *B60Q 1/50* (2013.01)
USPC ........ 340/902; 340/901; 340/425.5; 340/468; 340/471; 340/472; 362/459; 362/485; 362/487; 362/493

(58) Field of Classification Search
USPC .............. 340/901, 902, 425.5, 468, 470–472, 340/691.1, 691.6; 362/459, 485, 487, 493
See application file for complete search history.

(56) References Cited

U.S. PATENT DOCUMENTS

| | | | |
|---|---|---|---|
| 6,731,202 B1 * | 5/2004 | Klaus | 340/425.5 |
| 2003/0141966 A1 * | 7/2003 | Strumolo et al. | 340/435 |
| 2007/0247332 A1 * | 10/2007 | Halishak | 340/902 |

* cited by examiner

*Primary Examiner* — Kerri McNally
*Assistant Examiner* — Hongmin Fan
(74) *Attorney, Agent, or Firm* — TraskBritt, P.C.

(57) ABSTRACT

A warning system for vehicles that comprises a transmitter and a receiver for respectively transmitting a signal to an approaching vehicle or receiving a signal from an approaching vehicle. A light actuated upon receiving a signal from another vehicle and visible to the other vehicle indicates to the other vehicle that it is approaching a vehicle.

10 Claims, 1 Drawing Sheet

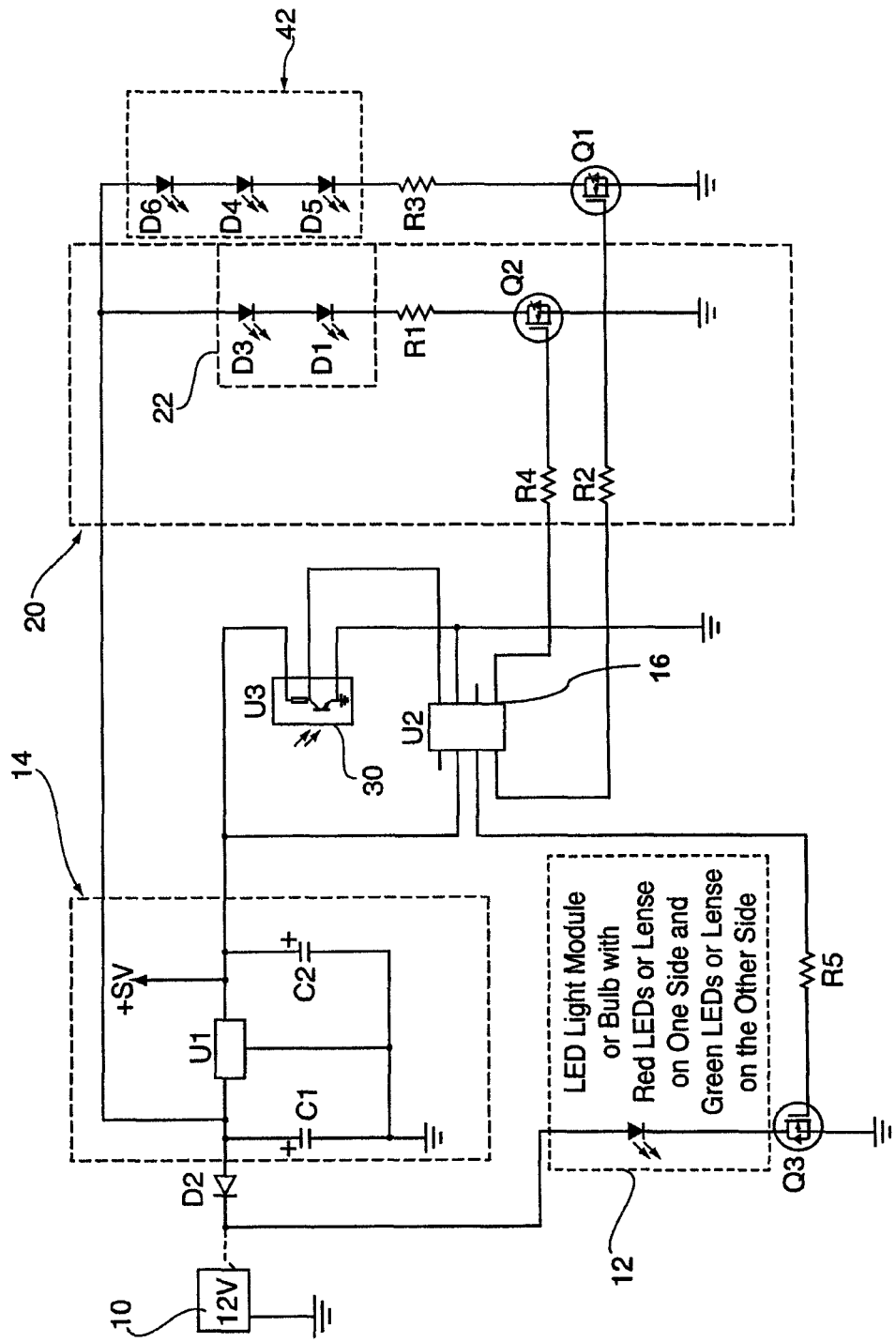

OFF-ROAD MOTOR VEHICLE WARNING SYSTEM

PRIORITY CLAIM

This application claims the benefit of the filing date of Canadian Patent Application Serial No. 2,708,657, filed Jun. 28, 2010, for "Off-Road Motor Vehicle Warning System," the entire disclosure of which is hereby incorporated herein by this reference.

TECHNICAL FIELD

This invention relates to vehicle warning systems and, in particular, to a traffic warning system for off-road vehicles, such as snowmobiles and all-terrain vehicles.

BACKGROUND

For many years, riding off-road vehicles, such as snowmobiles and all terrain vehicles (ATVs), has become a major organized recreational sport. In the province of Ontario alone, there are approximately 40,000 kilometers of snowmobile trails. Many of these trails are maintained by groomers, which are typically approximately 3 meters (10 feet) wide and thus maintain a trail width of at least 3 meters. The average off-road motor vehicle is approximately 1.3 meters (4 feet) in width. However, due to the nature of an off-road environment, many portions of such trails provide very little room for off-road vehicles to pass one another.

Over the years, a hand signal courtesy protocol has evolved to avoid accidents between off-road vehicles. With a legal maximum posted speed of 50 kilometers per hour (km/hr), or in some areas 70 km/hr, the approaching speed of oncoming vehicles can exceed 100 km/hr on a trail or roadway, with little more than a few feet of clearance, leaving very little room for error.

As an example of a protocol that has developed to avoid accidents, in a group of off-road vehicles such as snowmobiles or ATVs, the leader will provide a warning to oncoming traffic and the drivers in their own group by raising their left hand as a signal. For example, in a typical off-road trail protocol, the lead driver in each approaching group provides a warning of an oncoming vehicle to the others in their group that are following, by raising their left hand. The lead driver will also signal the approaching vehicle by raising a number of fingers to indicate the number of vehicles following the leader in the group. The second driver in the group does the same, and this protocol is repeated until the last driver raises a clenched fist to indicate to the oncoming vehicle that it is the last vehicle in the group.

However, given the speeds of approaching vehicles, the narrow width of such trails, and the unevenness and irregular surface jutting back and forth in tracks formed by previous vehicles, this protocol still presents dangers to approaching vehicles, particularly in times of limited visibility. Furthermore, a danger is presented in this conventional method of warning oncoming vehicles by requiring the driver of each vehicle to remove one hand from the vehicle's steering means.

It would be advantageous to provide a system for warning motor vehicles and others of approaching traffic or hazards, and indicating the number of vehicles approaching.

BRIEF DESCRIPTION OF THE DRAWINGS

In the drawings, which illustrate what is currently considered to be the best mode for carrying out the invention.

DETAILED DESCRIPTION OF THE INVENTION

Figure 1:
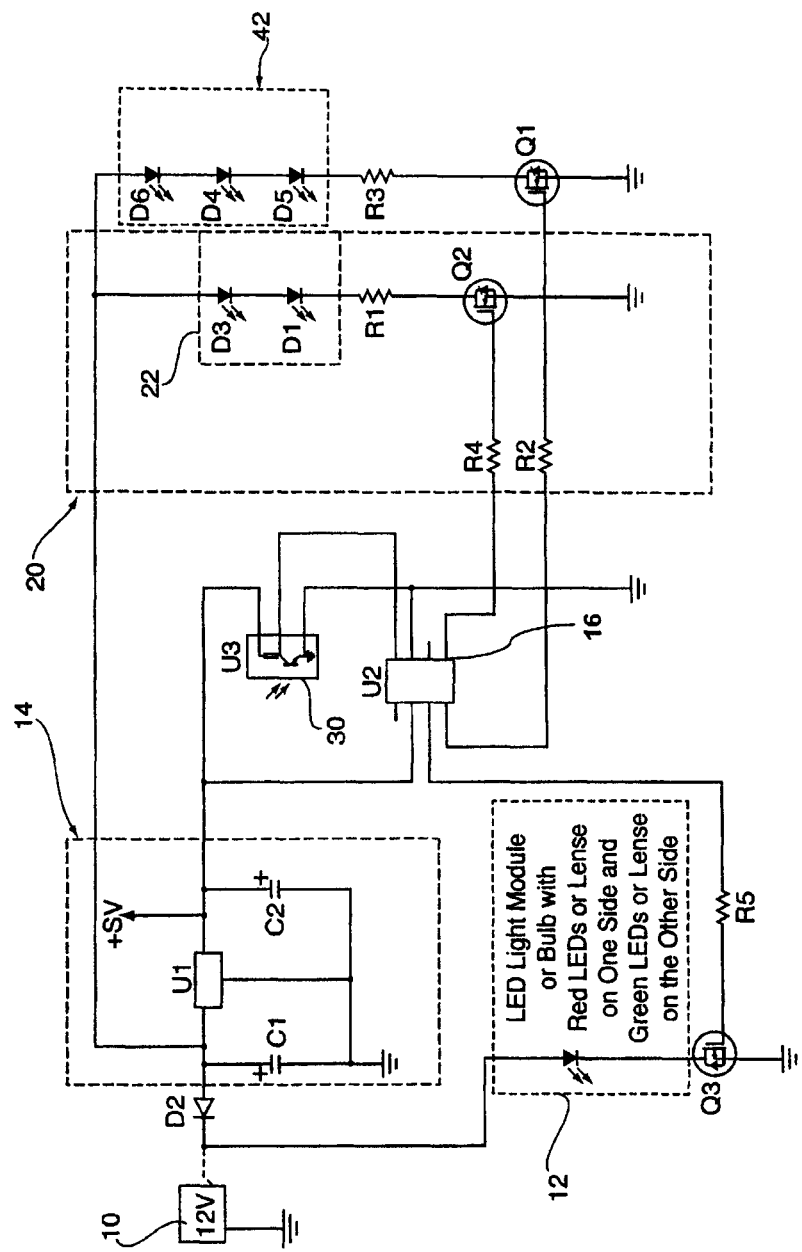
FIG. 1 is a schematic view of a sensor for an off-road motor vehicle warning system embodiment of the invention.

In an embodiment, each vehicle is provided with a warning system module, comprising a transmitter and receiver (or transceiver) and one or more warning lamps, which may be a single color or, preferably, different colors.

FIG. 1 illustrates one embodiment of a transmitter-receiver according to the invention. A 12 V DC power source 10 (for example, the vehicle battery, not shown) is coupled to an indicator lamp that emits light in the visible spectrum, for example, an LED module 12. The LED module 12 may comprise an amber LED and a green LED, or white LEDs covered by amber and green lenses. Amber would indicate "caution, approaching vehicle," and green would indicate the last vehicle in the group to signal that the way is clear. The amber and green lamps can be in different locations on the vehicle and, in the preferred embodiment, both may flash for greater visibility.

However, if desired, a single color indicator lamp of LED module 12 may be used, being white or any other selected color. If a single light color is used, it can flash as a caution indicator and remain illuminated to indicate the last vehicle in the group.

The power source 10 is also coupled to a 5 V DC low current power supply 14 for powering the transmitter-receiver circuitry. Microcontroller 16 is coupled to the power supply 14 and comprises a clock circuit, which transmits pulses to power the transmitter 20. The transmitter 20 comprises at least one infrared (IR) LED, or a plurality of IR LEDs, which may be connected in series as shown to form IR LED module 22, which emits IR radiation at a selected IR frequency. One side of the IR LED module 22 is coupled to the power supply 14, and the other is grounded through high-speed transistor Q2 (which may, for example, be a MOSFET).

Microcontroller 16 thus transmits a series of pulses, preferably continuously. The clock signal generated by microcontroller 16 toggles pin 5 of microcontroller 16 high and low, for example, at 38 kilohertz (KHz) generating a string of ten evenly spaced pulses followed by a short quiescent interval over 25 ms. The resulting pulses are transmitted to the gate of high-speed transistor Q2, which, in turn, grounds the IR LED module 22 at the selected pulse rate, causing the LEDs in LED module 22 to continuously emit a series of IR pulses at the selected pulse rate.

Microcontroller 16 is also coupled to IR receiver module 30. IR Receiver module 30 reacts to IR pulses only at the selected pulse transmit frequency (38 KHz in the example given), and does not respond to any other ambient Electro-Magnetic Radiation (EMR). The IR receiver module 30 shown in FIG. 1, by way of example, is a Vishay model TSOP34338, which has the advantage that it does not react unless it receives at least six pulses in the selected frequency range, thereby reducing opportunities for false alarms. When the IR receiver module 30 detects at least six pulses from a transmitter 20, the IR receiver module 30 output goes low, pulling pin 8 of microcontroller 16 low and, in turn, pulling pin 3 of microcontroller 16 high. The output of pin 3 is transmitted to the gate of Q3, which, in turn, grounds the visible LED module 12 causing the LEDs in module 12 to illuminate. Preferably, the clock circuitry in microcontroller 16 intervenes to toggle pin 3 between high and low states a few times each second, causing the LEDs in the visible indicator module 12 to blink for greater visibility.

The operation of the invention will now be described in the context of an oncoming vehicle approaching a group of five off-road vehicles, for example, snowmobiles, all of which are equipped with the warning system of the invention. The transmitter 20 of an approaching vehicle constantly emits a series of IR pulses via IR LED module 22, preferably confined to an arc of approximately 30 to 40 degrees directly in front of the vehicle. When the first vehicle in the group comes into range of the approaching vehicle, the IR signal is received by the IR receiver module 30 of the first vehicle in the group. The first vehicle's IR receiver module 30 detects the IR pulses from the oncoming vehicle at the selected transmit rate, causing microcontroller 16 to emit a signal to Q3 so that visible indicator lamp of LED module 12 on the first vehicle in the group illuminates (preferably, the signal to Q3 is pulsed, causing visible indicator lamp 12 to flash). The second, third and fourth vehicles' IR receiver modules 30 each respectively react in the same fashion upon coming into range of the signal transmitted from the approaching vehicle.

The fifth (last) vehicle in the group has preferably set its visible indicator module 12 to "trailing vehicle" mode, which is distinct from the visible indicator module 12 of the first four vehicles in the group. For example, where amber and green indicator lamps are used, both preferably flash for greater visibility, but in the normal (front or intermediate vehicle) warning mode, the amber light is enabled and flashes, whereas in the "trailing vehicle" mode, the green light is enabled and flashes. Where a single color of indicator light is used, the visible indicator module 12 of the vehicle in the "trailing vehicle" mode may provide a continuous signal (rather than a flashing signal, as in the case of the front and intermediate vehicles), to indicate to the approaching vehicle that the fifth vehicle is the final vehicle in the group. A driver of the approaching vehicle, seeing the normal warning light (flashing amber, in the two-color embodiment described above), therefore, knows that there are more vehicles in the group that it is approaching and about to pass, and can react to pass safely on a narrow trail. There is no reduction in control, as is the case when hand signals are used, because in the case of all vehicles, both of the driver's hands can remain on the vehicle steering actuator (such as handle bars, a steering wheel, etc.).

Slow moving vehicles such as groomers on an off-road trail can be provided with a similar warning module, optionally providing a different colored visible indicator light 12, which would instantly indicate to an approaching vehicle that it is approaching a slow moving, and typically wide, grooming vehicle. The driver of the approaching vehicle can react accordingly. Advantageously, the grooming vehicle may have multiple transmitters, allowing it to transmit its signal over a wider arc. Optionally, the grooming vehicle transmitter circuit 42 transmits at a different frequency or signal pattern from vehicles using the trail to activate the warning indicator lamp 12 of approaching vehicles; a second receiver module (not shown) on the approaching vehicle, responsive to the unique grooming vehicle frequency or signal pattern could activate a different colored light on the approaching vehicle, or an audible indicator such as a buzzer or siren, to indicate to the driver of the approaching vehicle that it is approaching a grooming machine (or some other trail hazard).

The electronics may be powered by the off-road vehicle battery, a separate battery or solar power.

Portable warning modules can be provided with a portable power source, such as a battery or solar power, and placed along the trail to warn of stationary hazards on the trail, such as a washed out portion, open water crossing, ice, logging trucks, disabled equipment, etc.

Other potential uses for the warning system of the invention include: construction, particularly road construction; train movement; fire response team and other such road hazards. It can also be used on multi-user trails for hikers, cross-country skiers, snowshoers and horseback riders, who could carry a transmitter or a transmitter-receiver of the invention to warn vehicles of their presence. The device of the invention can also be installed in vehicles as a safety device to warn of intruders, or to prompt inspection of a vehicle such as a school bus to assure that all children have exited at the end of a trip.

Various embodiments of the present invention having been thus described in detail by way of example, it will be apparent to those skilled in the art that variations and modifications may be made without departing from the invention.

What is claimed is:

1. A warning system for a group of vehicles, comprising:
a transmitter for association with an approaching vehicle transmitting a signal in front of the approaching vehicle;
a first receiver for association with a first vehicle of the group of vehicles for receiving a signal from the approaching vehicle,
at least one light associated with the first vehicle, and visible to the approaching vehicle to indicate to the approaching vehicle that it is approaching the first vehicle of the group of vehicles, said at least one light actuated upon receiving a signal from the approaching vehicle;
at least one trailing receiver for association with a trailing vehicle of the group of vehicles for receiving the signal transmitted from the approaching vehicle;
at least one trailing light associated with the trailing vehicle, said at least one trailing light displaying a distinct signal from the at least one light associated with the first vehicle, and visible to the approaching vehicle to indicate to the approaching vehicle that it is approaching the trailing vehicle of the group of vehicles.

2. The system of claim 1 comprising a plurality of lights having different colors.

3. The system of claim 1 wherein the at least one light flashes intermittently to indicate at least receiving a signal from the other vehicle.

4. The system of claim 1 wherein the signal comprises a series of pulses.

5. The system of claim 4 wherein the light is only actuated if the received signal comprises a series of pulses at a selected pulse rate.

6. The system of claim 1 wherein the signal is transmitted in an arc directly in front of the approaching vehicle.

7. A warning method for a group of vehicles, comprising:
transmitting a signal in front of an approaching vehicle;
receiving the signal at a first vehicle of the group of vehicles,
actuating at least one light at the first vehicle to indicate to the approaching vehicle that it is approaching the first vehicle of the group;
receiving the signal at a trailing vehicle of the group of vehicles;
actuating at least one trailing light at the trailing vehicle to indicate to the approaching vehicle that it is approaching the trailing vehicle of the group.

8. The method of claim 7 wherein the signal comprises a series of pulses.

9. The method of claim 8 wherein the light is only actuated if the received signal comprises a series of pulses at a selected pulse rate.

10. The method of claim 7 wherein the signal is transmitted in an arc directly in front of the approaching vehicle.

\* \* \* \* \*

UNITED STATES PATENT AND TRADEMARK OFFICE
CERTIFICATE OF CORRECTION

| | | |
|---|---|---|
| PATENT NO. | : 8,912,921 B2 | Page 1 of 2 |
| APPLICATION NO. | : 13/171154 | |
| DATED | : December 16, 2014 | |
| INVENTOR(S) | : James A. Reavell | |

It is certified that error appears in the above-identified patent and that said Letters Patent is hereby corrected as shown below:

In the drawing sheet, consisting of Fig. 1, should be deleted to be replaced with the drawing sheet, consisting of Fig. 1, as shown on the attached page.

Signed and Sealed this
Sixth Day of October, 2015

Michelle K. Lee
*Director of the United States Patent and Trademark Office*